United States Patent
Sakai et al.

(10) Patent No.: US 6,229,719 B1
(45) Date of Patent: May 8, 2001

(54) METHOD OF INVERTER CONTROL AND APPARATUS OF THE SAME

(75) Inventors: Keijiro Sakai, Kanasago; Toshiaki Okuyama, Tokai; Hiroshi Fujii, Chiba, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/655,489

(22) Filed: Sep. 5, 2000

(30) Foreign Application Priority Data

Nov. 12, 1999 (JP) ................................... 11-322888

(51) Int. Cl.$^7$ ................................ H02M 5/40; H02P 7/50
(52) U.S. Cl. ............................... 363/37; 363/41; 318/432; 318/802
(58) Field of Search ..................... 363/37, 39, 40, 363/41, 95, 131; 318/799, 801, 802, 810, 811, 432

(56) References Cited

U.S. PATENT DOCUMENTS 5,481,168 * 1/1996 Mutoh et al. ...................... 318/432
5,689,170 * 11/1997 Ishikawa ............................... 318/811
5,821,727 * 10/1998 Yura ................................. 318/801 X

FOREIGN PATENT DOCUMENTS 10-225199 * 8/1998 (JP) .

* cited by examiner

Primary Examiner—Jessica Han
(74) Attorney, Agent, or Firm—Antonelli, Terry, Stout & Kraus, LLP

(57) ABSTRACT

An inverter control apparatus includes an instruction calculator which receives a speed instruction and a particular component of a current of a motor to obtain an output frequency instruction and output voltage instructions of an inverter and a current estimator to estimate, according to a reference phase obtained by integrating a current detection value of one phase of an ac motor and an output frequency instruction thereof, currents of other phases of the ac motor. The current estimator includes a uvw/dq converter which converts a fixed coordinate system into a rotating coordinate system, a dq/uvw converter which is connected to the uvw/dq converter and which converts the rotating coordinate system into the fixed coordinate system, and a closed loop to input an output from the dq/uvw converter to the uvw/dq converter. This system can therefore estimate currents of other phases according to the motor current of one phase.

7 Claims, 4 Drawing Sheets

METHOD OF INVERTER CONTROL AND APPARATUS OF THE SAME

BACKGROUND OF THE INVENTION

1. Field of the Invention

The present invention relates to a method of and an apparatus for controlling an inverter which drives an induction motor at a variable speed, and in particular, to an automatic torque boost control method and an automatic torque boost control apparatus.

2. Description of the Related Art

In a known method to control an inverter to drive an induction motor at a variable speed, an output voltage V1 of the inverter is controlled in proportion to a primary frequency f1 of the inverter, i.e., V/f is kept fixed. The exciting current of an induction machine can be kept almost fixed in this method. However, when a load imposed onto the motor is increased, the voltage drop due to primary resistance 1 of the motor becomes greater and an induction or induced voltage of the motor is minimized. Resultantly, the exciting current of the motor is reduced and torque of the motor is lowered. Since an actual speed is lowered in response to a speed instruction, the speed regulation is increased. To overcome these difficulties, there have been proposed many automatic torque boost control methods to increase the motor torque particularly in a range of low and intermediate frequencies.

In general, a two-phase motor current is detected, the current is transformed from a fixed coordinate system to a rotating coordinate system (uvw/dq conversion) using a magnetic flux phase to obtain a torque current It. A voltage drop of primary resistance r1·It corresponding to the torque current It is added to fixed voltage (induction voltage) V/f. As a result, a voltage instruction Vm is produced as represented by expression (1).

$$Vm = K \cdot f1^* + r1 \cdot It \quad (1)$$

where, * indicates an instruction value and K is a proportional gain.

A slip frequency fs proportional to the torque current It is added to a reference frequency fn* to obtain an inverter output frequency instruction f1* as follows.

$$f1^* = fn^* + fs = fn^* + Ks \cdot It \quad (2)$$

where, Ks is a proportional gain.

In a method to detect a torque current from the two-phase current of the motor, instantaneous motor currents of two phases are transformed by a uvw/dq conversion, namely, from a fixed coordinated system to a rotating coordinate system. Therefore, the current of the torque can be instantaneously and correctly detected. The torque boost is automatically controlled according to the torque current. Consequently, the automatic torque boosting operation can be controlled with high response and high precision. However, this method requires motor current sensors or detectors for two phases and accordingly current sensor circuits for two phases. This soars the price of the inverter system.

JP-A-10-225199 describes a method to estimate a current vector using a motor current of one phase. In this method, alternating currents of other phases are estimated according to a state equation expressed by an inverter output voltage instruction, a motor current, and a motor impedance. The alternating currents are then transformed by a uvw/dq conversion to estimate current vectors. However, the state equation includes parameters, which in the motor control operation include such motor constants as a primary resistance, a secondary resistance, and mutual inductance. For each type of the motor, it is necessary to set these constants. This invention is related to relatively small-sized motors, which are produced in many types. For each type of the motor, it is disadvantageously required to collect the motor constants. The motor constants vary depending on a temperature corresponding to a load change. For example, the resistance value varies in a range from about 20% to about 30% of the original value according to an operating state. Therefore, a large error appears with respect to a setting value and the estimated current value is decreased in precision.

SUMMARY OF THE INVENTION

It is therefore an object of the present invention to provide a current vector estimation method of estimating, using a motor current of one phase, currents of other phases without using the motor constants as well as a low-priced inverter system applicable to general purposes.

Another object of the present invention is to provide an inverter control method and an inverter control apparatus in which a high-torque control operation is conducted particularly in low and middle speed zones with a minimized speed regulation by improving the precision of current estimation.

One aspect of the present invention resides in a closed loop system. In this closed loop system, a current vector including an actually detected motor current of one phase and a motor current of other phases finally estimated and supplied as a feedback item is converted, using a reference phase obtained by integrating an output frequency from an inverter, into a rotating coordinate system to obtain instantaneous values respectively of torque current Iq and exciting current Id. By calculating an average value of each of torque current Iq and exciting current Id and by inversely converting the coordinate system of each average value into the fixed coordinate system, there are estimated currents of other phases.

Consequently, there is provided according to the present invention an inverter control method of converting a dc power into an ac power having a variable frequency and a variable voltage according to an output frequency instruction (f1*) and output voltage instructions (Vd*, Vq*) of an inverter (4) to control an ac motor (1) at a variable speed, comprising the steps of inputting to an input point a current detection value (iu) of one phase of the ac motor (1) and current estimation values (iws, ivs) of other phases thereof, converting the current detection value (iu) and the current estimation values (iws, ivs) into a rotating coordinate system (uvw/dq) according to a reference phase obtained by integrating the output frequency instruction (f1*) of the inverter (4) to obtain instantaneous values respectively of a torque current (Iq) and an exciting current (Id), inputting average values of the instantaneous values, converting the values into a fixed coordinate system according to the reference phase to obtain the current estimation values of the other phases and feeding the values back to the input point, and controlling an output voltage or an output frequency of the inverter (4) according to the instantaneous value or the average value of the torque current (Iq).

According to the present invention, the inverter control method further includes the step of controlling an output voltage or an output frequency of the inverter (4) according to a primary current (I1) of the ac motor (1) attained according to the instantaneous value or the average values respectively of the torque current (Iq) and the exciting current (Id). The primary current (I1) is obtained as a square root of a sum of $Iq^2$ and $Id^2$.

According to the present invention, the inverter control method further includes the steps of estimating the torque current (Iq) for each sampling of the current detection value of one phase (iu) and increasing, when a load is increased, the output voltage or frequency of the inverter (4) according thereto. As a result, even when the load is changed, the torque current can be estimated with high response, and hence the inverter output voltage and the inverter output frequency can be also compensated for with high response and with high precision.

To estimate the torque current according to the present invention, there are only required a reference phase instruction and a detected value of a current of one phase. Therefore, even if information of voltages, motor constants, and the like is not clearly determined, the torque current can be estimated. Consequently, this method can be applied to various general purposes. Since the parameters employed in this method are fixed regardless of variation in the load, the estimated values have high precision. Additionally, for the currents of other phases estimated according to the present invention, the estimation error is minimized by the negative feedback thereof, the estimated torque current is resultantly attained with high precision. Consequently, the inverter torque boosting operation can be controlled with increased precision for the compensation of the output voltage and the output frequency.

According to the present invention, there is provided an inverter control apparatus comprising an instruction calculating section (6) and a particular component of a current of an ac motor (1) and for calculating an output frequency instruction (f1*) and output voltage instructions (Vd*, Vq*) of an inverter (4) in which a dc power is converted into an ac power having a variable frequency and a variable voltage according to the output frequency instruction (f1*) and the output voltage instructions (Vd*, Vq*) to control the ac motor (1) at a variable speed, a current estimating unit (11) including a uvw/dq converter (16) and a dq/uvw converter (18). The uvw/dq converter (16) converts the current detection value (iu) and the current estimation values (iws, ivs) into a rotating coordinate system (uvw/dq) using a primary delay filter (13) and thereby estimates currents respectively of different phases (Id, Iq) of the ac motor (1) using a current detection value (iu) of the ac motor (1) and a reference phase obtained by integrating the output frequency instruction (f1*) of the inverter (4). The dq/uvw converter (18) connected to the uvw/dq converter (16) converts the rotary coordinate system into a fixed coordinate system. The current estimating unit (11) includes a closed loop for inputting the output from the dq/uvw converter (18) to the uvw/dq converter (16).

In the inverter control apparatus, the current estimating unit (11) inputs a current detection value (iu) of the ac motor (1) and current estimation values of other phases (iws, ivs) thereof to the uvw/dq converter (16) to convert the values into a rotating coordinate system using the reference phase to produce instantaneous estimation values respectively of the torque current (Iq) and the exciting current (Id). The first delay filter (13) produces average values (using a smoothing operation) respectively of the instantaneous estimation values to produce average estimation values respectively of the torque current (Iq) and the exciting current (Id). The dq/uvw converter (18) receives as inputs thereto the average estimation values and converts the values into the fixed coordinate system to produce the current estimation values of other phases (Id, Iq). The current estimating unit (11) controls the output voltage or frequency of the inverter (4) according to the instantaneous estimation value or the average estimation value using the torque current (Iq) as the particular component of the motor current.

In the inverter control apparatus, the instruction calculating section (6) includes a V/f pattern voltage generating unit (15) of which a voltage pattern can be manually varied in response to the output frequency instruction (f1*), and a voltage (Em*) generated by the pattern voltage generator (15) is added to a voltage correction amount ($\Delta$Vq) varying according the particular component of the motor current to obtain a voltage instruction value (Vq). The output voltage of the inverter (4) is controlled according to the voltage instruction value (Vq).

In general, to control the V/f pattern for the automatic torque boost, the no-load current of the motor is controlled to be substantially a fixed value by setting induction voltage instruction Em* to a value proportional to primary frequency instruction f1*. Also in the automatic torque boost of the present invention, it is possible to manually and variably set the V/f pattern to a desired value. Therefore, the torque can be sufficiently increased at an initial stage although the no-load current of the motor becomes slightly greater. Since the exciting current is increased, the torque current is reduced and the automatic torque boost can be stably controlled regardless of such a slight error in the estimated values of the torque current.

In the inverter control device, wherein the instruction calculating section (6) includes a slip frequency correcting unit (14a) for correcting, according the particular component of the motor current, a slip frequency (fs) inputted to the instruction calculating section (6) together with the speed instruction (fn*) to attain the output frequency instruction (f1*). As a result, even when the load becomes greater, the speed regulation can be reduced.

The objects and features of the present invention will become more apparent from the consideration of the following detailed description taken in conjunction with the accompanying drawings.

DESCRIPTION OF THE EMBODIMENTS

Figure 1:
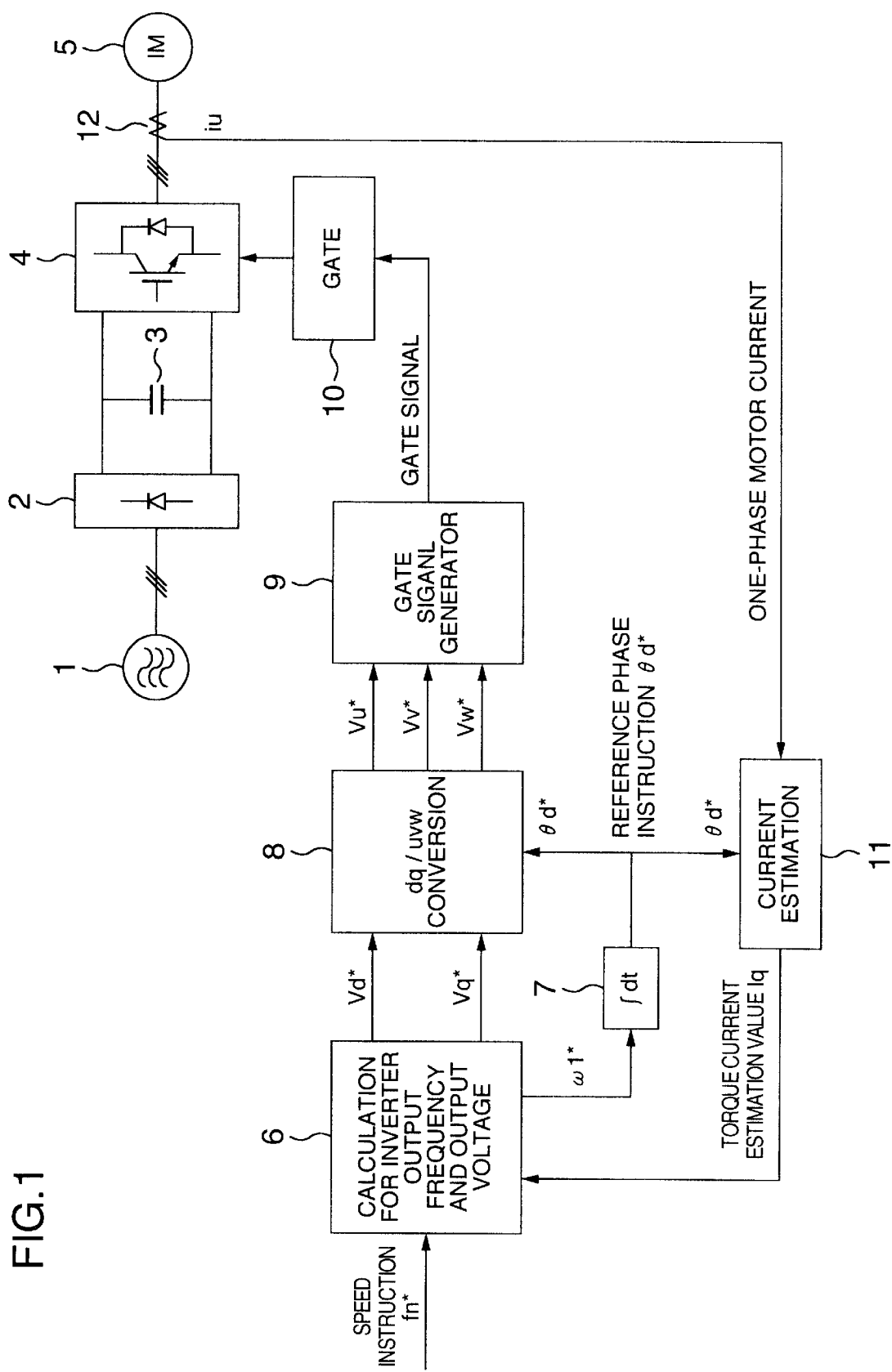
FIG. 1 is a block diagram showing an embodiment of an inverter control system according to the present invention.

Referring now to the drawings, description will be given of an embodiment of an inverter control system of the present invention. FIG. 1 shows in a block diagram of an inverter control block to control an alternating-current (ac) motor at a variable speed. In this system, an alternating current from an ac power source 1 is transformed by a rectifier circuit 2 and a smoothing condenser 3 into a direct current (dc). The dc power is converted by an inverter 4 into an alternating current having a variable frequency and a variable voltage to drive an induction motor 5 at a variable speed. The output frequency and the output voltage of the inverter 4 are controlled by the inverter control circuit via a gate circuit 10.

The inverter control circuit of this embodiment includes an inverter output frequency and voltage calculating section 6 which receives a speed instruction fn* and a torque current estimation value Iq of an induction motor under consideration to calculate a primary angular frequency instruction ω1* and an inverter output voltage instruction, a dq/uvw converter 8 to convert rotating coordinate components Vd* and Vq* of an inverter output voltage instruction into fixed coordinates components Vu*, Vv*, and Vw* of a three-phase ac voltage instruction, a gate signal generator 9 to generate a gate signal corresponding to the instantaneous ac voltage instruction, an integrator circuit 7 to integrate primary angular frequency instruction ω1* to supply a reference phase instruction θd* resultant from the integration to dq/uvw converter 8, and a current estimating section or estimator 11 which receives a motor current of one phase iu detected by a current detector 12 and reference phase instruction θd* and estimates a torque current estimation value Iq to supply the value Iq to frequency and voltage calculator 6.

In this configuration, dq/uvw converter 8 converts rotating coordinate components Vd* and Vq* of an inverter output voltage instruction into fixed coordinate components Vu*, Vv*, and Vw* of a three-phase ac voltage instruction according to operations of expressions (3-1), (3-2), and (3-3) as follows.

$$Vu^* = Vd^* \cdot \cos \theta d^* - Vq^* \cdot \sin \theta d^* \quad (3\text{-}1)$$

$$Vw^* = -Vu^*/2 - \sqrt{3}(Vd^* \cdot \sin \theta d^* + Vq^* \cdot \cos \theta d^*)/2 \quad (3\text{-}2)$$

$$Vv^* = -(Vu^* + Vw^*) \quad (3\text{-}3)$$

Subsequently, description will be given in detail of configurations and operation of output frequency and voltage calculator 6 and torque current estimator 11 as primary sections of the inverter control circuit of this embodiment. The other sections are well known and hence details thereof will not be described.

Figure 2:
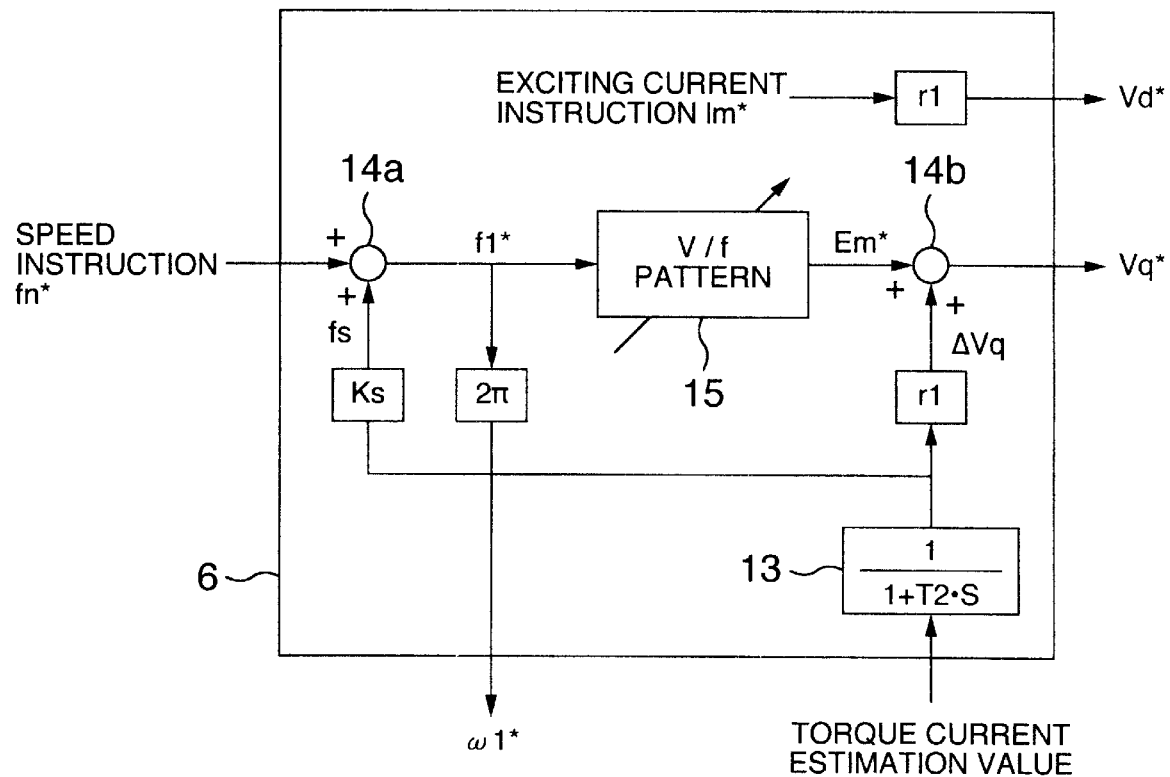
FIG. 2 is a block diagram showing details of an inverter output frequency and voltage calculating section of FIG. 1.

FIG. 2 shows, in a functional block section, the configuration of inverter output frequency and voltage calculator 6. Rotating coordinate component Vd* of the d-axis voltage instruction specifies a fixed voltage of Im*·r1, where Im* is an instruction value of an exciting current (un-load motor current) and r1 is a primary resistance setting value of motor 5.

Rotating coordinate component Vq* is calculated for the q-axis voltage instruction as follows. First, an adder 14a adds a basic speed instruction fn* to a slip frequency fs to attain an inverter output frequency instruction f1* (primary frequency instruction). This value of f1* is multiplied by two to obtain primary angular frequency instruction ω1*. By adding slip frequency fs to speed instruction fn* as above, the actual speed approaches speed instruction fn* and hence the speed regulation or variation is minimized. Slip frequency fs is calculated by primary delay filter 13 and proportional gain unit Ks using current estimation value Iq. Proportional gain unit Ks is set to a value Ks =fso/Ito, where Ito and fso respectively indicate a rated torque and a rated slip frequency of motor 5.

Figure 3:
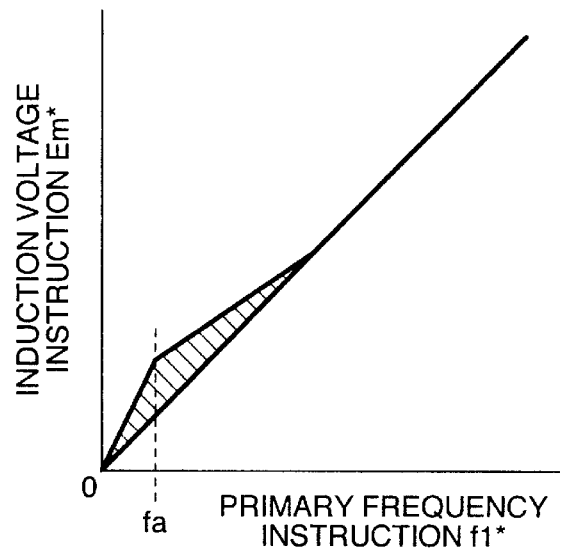
FIG. 3 is a graph showing a V/f pattern in an embodiment of the present invention.

Next, inverter frequency output instruction f1* is fed to a V/f pattern circuit 15 to produce an induction voltage instruction Em*. FIG. 3 shows an example of the V/f pattern. Ordinarily, f1* and Em* are respectively set as indicated by a broken line and a straight line to automatically control the torque boost. However, in this embodiment, the pattern is set as indicated by a solid line to increase induction voltage instruction Em* in a low-frequency zone. That is, a voltage indicated by a shaded region is added to the V/f pattern to obtain a peak value at a frequency of fa. By manually changing the size of the shaded region for frequency fa, induction voltage instruction Em* can be set to a desired value. This satisfies requirement of sufficient torque of motor 5 in a low-speed range.

Thereafter, torque current estimation value Iq is supplied via primary delay filter 13 and is multiplied by primary resistance value r1 to obtain a quantity of correction Δvq for q-axis voltage instruction Vq*. Adder 14b adds induction voltage instruction Em to correction ΔVq to produce q-axis voltage instruction Vq*.

In this embodiment described above, the automatic torque boost control in which the inverter output voltage is corrected by changing correction ΔVq according to torque current estimation value iq is employed in combination with a fixed torque boost according to the V/f pattern in which the voltage is manually adjusted in a low-frequency range. Therefore, the torque of the motor can be increased in the low-speed range, for example, in an initial starting operation. When the V/f pattern voltage is increased, the exciting current becomes greater and the torque current is lowered. In consequence, the torque boost can be stably achieved even if the estimation value of the torque current estimator 11 includes a slight error.

Figure 4:
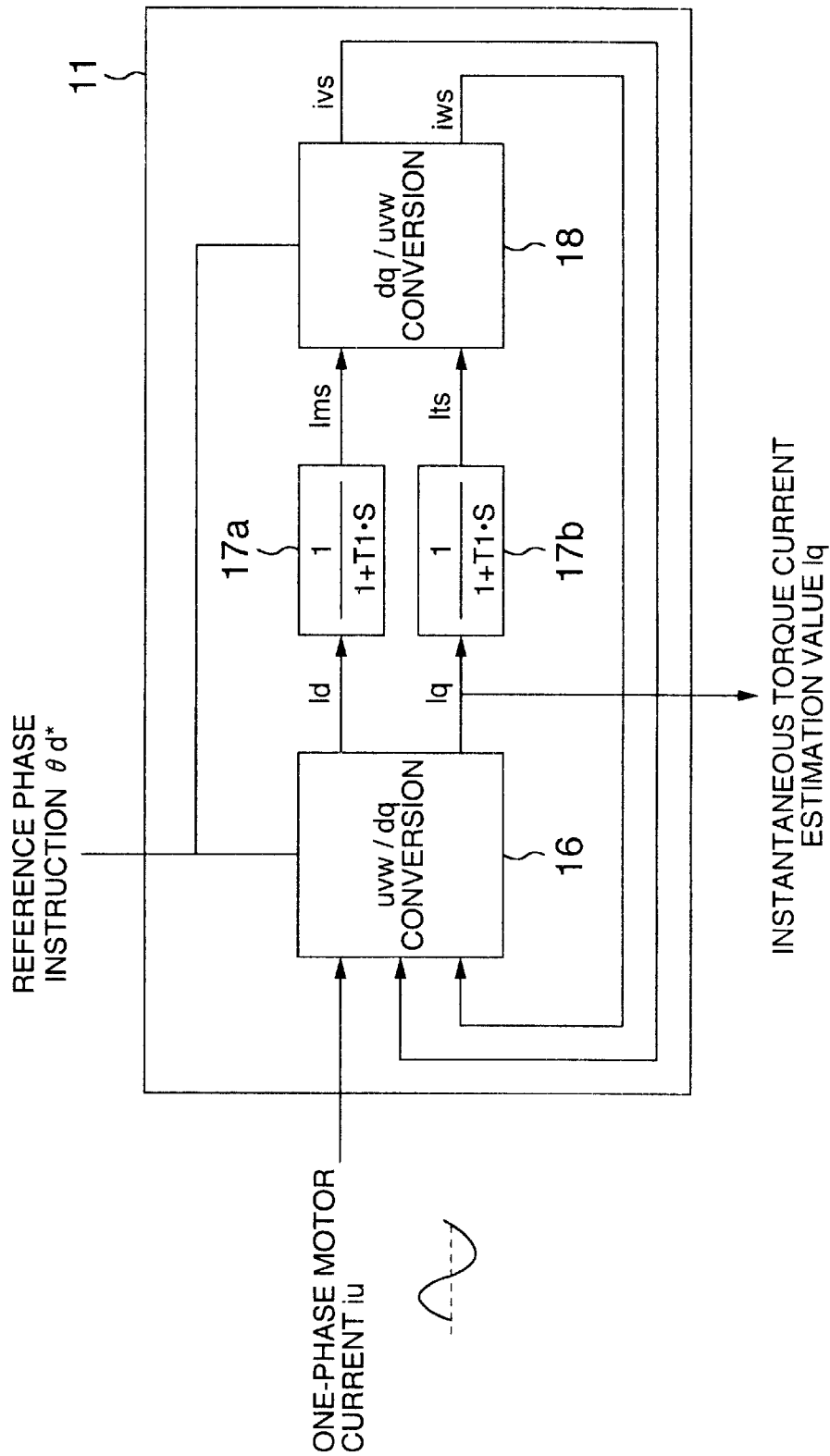
FIG. 4 is a block diagram showing details of a torque current estimator of FIG. 1.

FIG. 4 shows in a functional block diagram the configuration of an embodiment of torque current estimating section 11. Torque current estimator 11 includes a uvw/dq converter 16, primary delay filters 17a and 17b, and a dq/uvw converter 18. The converter 16 receives a current iu of actual motor current of phase U, alternating current estimation values ivs and iws respectively of phases U and W, and reference phase instruction θd* and executes a converting operation of expression (4-1) and (4-2) below to produce rotating coordinate values Id and Iq respectively representing the instantaneous exciting current and the instantaneous torque current estimation value.

$$Id = iu(\cos \theta d^*) + ivs(\cos \theta d^* + 2\pi/3) + iws(\cos \theta d^* + 4\pi/3) \quad (4\text{-}1)$$

$$Iq = iu(\sin \theta d^*) + ivs(\sin \theta d^* + 2\pi/3) + iws(\sin \theta d^* + 4\pi/3) \quad (4\text{-}2)$$

Exciting current estimation value Id and torque current estimation value Iq are then fed respectively to primary delay filters 17a and 17b respectively having a time constant of T1 to produce averaged values Ims and Its respectively of the values Id and Iq. On receiving values Ims and Its, dq/uvw converter 18 executes operations of expressions (5-1), (5-2), and (5-3) below for the received values to calculate motor current estimation values ius, ivs, and iws represented in the fixed coordinate system.

$$ius = Ims \cdot \cos \theta d^* - Its \cdot \sin \theta d^* \quad (5\text{-}1)$$

$$iws = -ius/2 - \sqrt{3}(Ims \cdot \sin \theta d^* + Its \cdot \cos \theta d^*)/2 \quad (5\text{-}2)$$

$$ivs = -(ius + iws) \quad (5\text{-}3)$$

Torque current estimator 11 repeatedly execute the operation above for each sampling period of actual motor current, and converter 16 outputs torque current estimation value Iq to inverter output frequency and voltage calculator 6. Since alternating current estimation values ivs and iws respectively of phases V and W are fed back to uvw/dq converter 16, the calculation error is minimized according to an advantageous effect of the negative feedback. Therefore, the estimation can be carried out with higher precision. For the operation of torque current estimator 11, it is only necessary to supply actual motor current iu of phase U and reference phase instruction θd*. As can be seen from expressions (4-1), (4-1), (5-1), (5-2), and (5-3), since the operation is independent of the state parameters which vary depending on the motor parameters including a type and a load of a motor under consideration, this method can be implemented with high precision and is applicable to general purposes.

Description will next be given of results of simulation in which torque currents are estimated in the detection of currents of two phase according to the prior art and in the detection of a current of one phase according to the present invention. In this simulation, the motor load is varied from a no-load state to a state of 150% torque with speed instruction fn* set to 3 herz (Hz) using data measured for phases U and W.

Figure 5:
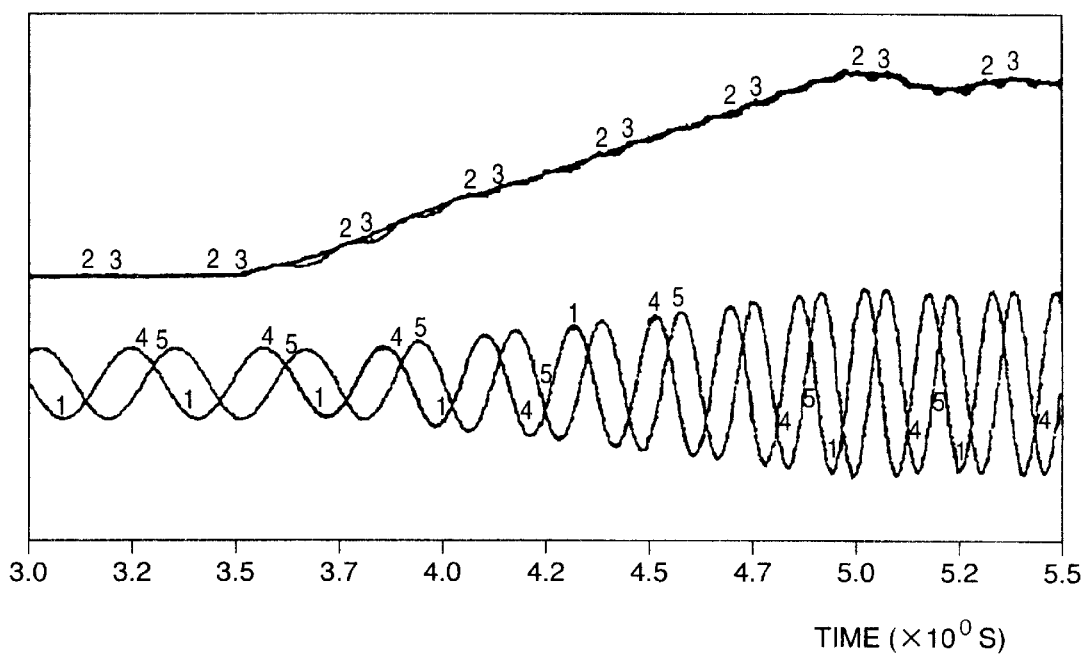
FIG. 5 is graph showing current waveforms resultant from simulation of detection of currents of two phases and detection of a current of one phase according to the present invention.

FIG. 5 shows, in a graph, torque current waveforms resultant from the simulation. The waveforms in a lower-half section of the graph show value iu (5) detected for phase U, value iw (4) detected for phase W, and estimation value iws (2) for phase W. When a load is imposed at time 3.5 (sec), actual currents iu and iw respectively of phases U and W become greater. When actual current iu increases, torque current Its becomes greater according to the relationships of expressions (4-1) and (4-1), and estimation current iws obtained through the dq/uvw conversion increases according to the relationships of expressions (5-1), 5-2, and (5-3). As shown in this graph, estimation value iws of phase W obtained in this simulation satisfactorily follows detection value iw of phase W. This means that these values match well with each other.

The waveforms in an upper-half section of the graph show a torque current (as indicated by 2) obtained according to the detection of currents of two phases and a torque current Iq' (as indicated by 3) estimated according to the detection of a current of one phase of this embodiment. Assuming that the torque current of the current detection for two phases is assumed to be a true value, although the torque current Iq' of this embodiment slightly includes ripple components, this current almost well follows the true value. Since torque current Iq' is supplied via primary delay filter 13 to frequency and voltage calculating section 6, the ripple components of the torque current Iq' are minimized. The calculator 6 compensates for primary resistance voltage drop ΔVq and slip frequency fs with high precision.

According to the embodiment, the torque current can be estimated using only the motor current of one phase in almost the same way as for the estimation using the current detection for two phases. Using the torque current thus estimated, the motor torque can be increased by compensating for the primary resistance voltage drop. Since the slip frequency is corrected, the speed regulation can be reduced even if the load becomes greater. In place of instantaneous torque current estimation value Iq, torque current estimation value Its obtained by primary delay filter 17*b* as a mean value thereof may be inputted to the frequency and voltage calculating section 6 to obtain an advantageous effect similar to that attained above.

Description will now be given of a variation of the torque current estimation method using the current detection for one phase described above. In the neighborhood of a rated load, the magnitude of torque current estimation value Iq is about twice that of exciting current estimation value Id. Therefore, as can be seen from expressions (6-1) and (6-2) below, primary motor current I1 attained as a square root of a sum of $Id^2$ and $Iq^2$ is not particularly different from torque current estimation value Iq.

$$I1 = \sqrt{(Id \cdot Id + Iq \cdot Iq)} \tag{6-1}$$

$$I1s = \sqrt{(Ims \cdot Ims + Its \cdot Its)} \tag{6-2}$$

Assume in this situation that a calculation circuit to obtain primary current I1 using exciting current estimation value Id and torque current estimation value Iq or a calculation circuit to obtain primary current estimation value I1s from exiting current estimation value Ims and torque current estimation value Its. By inputting obtained values 1 or I1s above to inverter output frequency and voltage calculating section 6, there can be attained an advantage similar to that obtained in the operation using torque current estimation value Iq.

What is claimed is:

1. An inverter control method of converting a dc power into an ac power having a variable frequency and a variable voltage according to an output frequency instruction and output voltage instructions of an inverter to control an ac motor at a variable speed, comprising the steps of:

inputting to an input point a current detection value of one phase of the ac motor and current estimation values of other phases thereof;

converting the current detection value and the current estimation values into a rotating coordinate system according to a reference phase obtained by integrating the output frequency instruction of the inverter to obtain instantaneous values respectively of a torque current and an exciting current;

inputting average values respectively of the instantaneous values;

converting the values into a fixed coordinate system according to the reference phase to obtain the current estimation values of the other phases and feeding the values back to the input point; and controlling an output voltage or an output frequency of the inverter according to the instantaneous value or the average value of the torque current.

2. An inverter control method according to claim 1, further including the steps of:

estimating the torque current for each sampling of the current detection value of one phase; and increasing, when a load is increased, the output voltage or frequency of the inverter according thereto.

3. An inverter control method of converting a dc power into an ac power having a variable frequency and a variable voltage according to an output frequency instruction and output voltage instructions of an inverter to control an ac motor at a variable speed, comprising the steps of:

inputting to an input point a current detection value of one phase of the ac motor and current estimation values of other phases thereof;

converting the current detection value and the current estimation values into a rotating coordinate system according to a reference phase obtained by integrating the output frequency instruction of the inverter to obtain instantaneous values respectively of a torque current and an exciting current;

inputting average values respectively of the instantaneous values;

converting the values into a fixed coordinate system according to the reference phase to obtain the current estimation values of the other phases and feeding the values back to the input point; and controlling an output voltage or an output frequency of the inverter according to a primary current of the ac motor attained according to the instantaneous value or the average values respectively of the torque current and the exciting current.

4. An inverter control apparatus, comprising:

an instruction calculating section for receiving as inputs thereto a speed instruction and a particular component of a current of an ac motor and for calculating an output frequency instruction and output voltage instructions of an inverter in which a dc power is converted into an ac power having a variable frequency and a variable voltage according to the output frequency instruction and the output voltage instructions to control the ac motor at a variable speed;

current estimating means including a uvw/dq converter and a dq/uvw converter, the uvw/dq converter converting the current detection value and the current estimation values into a rotating coordinate system using a primary delay filter and thereby estimating currents respectively of different phases of the ac motor using a current detection value of the ac motor and a reference phase obtained by integrating the output frequency instruction of the inverter;

the dq/uvw converter, connected to the uvw/dq converter, converting the rotary coordinate system into a fixed coordinate system, the current estimating means including a closed loop for inputting the output from the dq/uvw converter to the uvw/dq converter.

5. An inverter control apparatus according to claim 4, wherein:

the current estimating means inputs a current detection value of the ac motor and current estimation values of other phases thereof to the uvw/dq converter to convert the values into a rotating coordinate system using the reference phase to produce instantaneous estimation values respectively of a torque current and an exciting current;

the first delay filter produces average values respectively of the instantaneous estimation values to produce average estimation values respectively of the torque current and the exciting current;

the dq/uvw converter receives as inputs thereto the average estimation values and converts the values into the fixed coordinate system to produce the current estimation values of other phases; and the current estimating means controls the output voltage or frequency of the inverter according to the instantaneous estimation value or the average estimation value using the torque current as the particular component of the motor current.

6. An inverter control apparatus according to claim 4, wherein:

the instruction calculating section includes V/f pattern voltage generating means of which a voltage pattern can be manually varied in response to the output frequency instruction;

a voltage generated by the pattern voltage generating means is added to a voltage correction amount varying according the particular component of the motor current to obtain a voltage instruction value; and the output voltage of the inverter is controlled according to the voltage instruction value.

7. An inverter control device according to claim 4, wherein the instruction calculating section includes slip frequency correcting means for correcting, according the particular component of the motor current, a slip frequency inputted to the instruction calculating section together with the speed instruction to attain the output frequency instruction.

* * * * *